(12) United States Patent
Su et al.

(10) Patent No.: US 8,568,597 B2
(45) Date of Patent: Oct. 29, 2013

(54) PROCESS FOR PURIFYING SILICON SOURCE MATERIAL BY HIGH GRAVITY ROTATING PACKED BEDS

(76) Inventors: Shyang Su, Taipei (TW); Yi-Heng Su, Hsinchu (TW); Michael Vukelic, Hsinchu (TW)

( * ) Notice: Subject to any disclaimer, the term of this patent is extended or adjusted under 35 U.S.C. 154(b) by 616 days.

(21) Appl. No.: 12/662,874

(22) Filed: May 10, 2010

(65) Prior Publication Data
US 2011/0274608 A1    Nov. 10, 2011

(51) Int. Cl.
*B01D 24/28* (2006.01)

(52) U.S. Cl.
USPC ............ 210/780; 210/781; 210/784; 210/786

(58) Field of Classification Search
USPC .................................. 210/780, 781, 784, 786
See application file for complete search history.

(56) References Cited

U.S. PATENT DOCUMENTS

| 4,283,255 | A | * | 8/1981 | Ramshaw et al. | ............... 203/49 |
| 4,374,110 | A | | 2/1983 | Darnell et al. | |
| 4,409,195 | A | * | 10/1983 | Darnell et al. | ............... 423/342 |
| 5,616,245 | A | | 4/1997 | Albrecht | |

* cited by examiner

*Primary Examiner* — Chester Barry
(74) *Attorney, Agent, or Firm* — Bacon & Thomas, PLLC

(57) ABSTRACT

A process is disclosed for purification of silicon source material including trichlorosilane. First, the silicon source material in liquid state with impurities vapor and the other chlorosilane or silane are passing a first high gravity rotating packed bed with porous metal, at a temperature lower than the boiling point of the silicon source material, the impurities vapor and the other chlorosilane or silane are separated from the liquid silicon source material; second, the silicon source material in liquid state is fed to a second high gravity rotating packed bed, oxygen is also fed to the second high gravity rotating packed bed to form impurity-containing siloxane complexes with higher boiling point. Finally distilling to remove the impurity-containing siloxane complexes from the silicon source material.

4 Claims, 2 Drawing Sheets

PROCESS FOR PURIFYING SILICON SOURCE MATERIAL BY HIGH GRAVITY ROTATING PACKED BEDS

BACKGROUND OF THE INVENTION

1. Field of the Invention

The present invention relates to a process for purifying silicon source materials, and more particularly to a process for purifying trichlorosilane or mixtures of trichlorosilane and silicon tetrachloride by high gravity rotating packed bed.

2. Description of Relative Prior Art

Electronic grade polysilicon (EGS) can be obtained from trichlorosilane or mixtures of trichlorosilane and silicon tetrachloride after removing impurities such as boron and phosphorus. Most impurities can be readily removed from trichlorosilane or silicon tetrachloride by distillation. Trace impurities of boron or phosphorus which are usually present in the form of $BCl_3$, $PCl_3$, $B_2H_6$ or $PH_3$, however, to reduce such contamination to an acceptably low level by distillation would require several sequential distillation steps. One reason is that the bubble of the impurity gases is not easy to pump out from the liquid state of trichlorosilane and silicon tetrachloride, and the impurity gas may dissolve in the liquid. The other reason is that the boiling point of $BCl_3$ (12.5° C.) and $PCl_3$ (74.2° C.) is not high enough nor low enough and may coming out with trichlorosilane when the temperature rise above 32° C. to extract trichlorosilane.

U.S. Pat. No. 5,616,245 to Albrecht et al. teaches a high gravity separator to separate solid materials. Other process has been proposed for purifying water to remove out the oxygen or other gas with a high gravity separator. U.S. Pat. No. 4,283,255 to Ramshaw et al. teaches a process and apparatus for effecting mass transfer between two fluid phases by using a rotating element, but none of the prior arts using rotating element is used to remove the impurities in silicon source materials. U.S. Pat. Nos. 4,374,110 and 4,409,195 to Darnell et al. teaches a process to purify silicon source materials by reacting small amounts of oxygen with trichlorosilane in gas state at a temperature between 170° C. or 60° C. to 300° C.

It is desirable to have a purification process which achieve a still higher level of purification and does not require the time and expense of multiple distillation and high temperature reaction.

OBJECTS OF THE INVENTION

It is therefore an object of the invention to provide an improve process for purifying silicon source materials.

It is another object of the invention to provide an improve process for purifying trichlorosilane.

It is a further object of the invention to provide an improve process for purifying tetrachloride.

It is a still further object of the invention to provide an improve process for purifying mixture of trichlorosilane and tetrachloride It is yet a further object of the invention to provide an improve process for removing boron and phosphorus impurities in gas or liquid from silicon source at lower temperature.

DISCLOSURE OF THE INVENTION

A first aspect of the present invention teaches a process for purification of silicon source material includes trichlorosilane and tetrachloride by high gravity rotating packed bed, comprising the steps of: Passing the silicon source material in liquid state through a high gravity rotating packed bed with porous metal, the high gravity rotating packed bed is at a temperature lower than the boiling point of the silicon source material, the impurities vapor and the other chlorosilane or silane are separated by pumping out for re-use or abandon; Collecting the liquid state purified silicon source material having impurities with higher boiling point than the silicon source material; Distilling to remove the siloxane complexes from the silicon source material.

A second aspect of the present invention teaches a process for purification of silicon source material includes trichlorosilane and tetrachloride by high gravity rotating packed bed, for removing impurities including one or more of boron, phosphorus, arsenic and aluminum in the form of chlorides, hydrides, or intermediate compounds containing both hydrogen and chlorine from the silicon source material, oxygen is fed to the high gravity rotating packed bed from the rim, and is present in a molar ratio with trichlorosilane of about 0.005 to 0.5 by control the flow rate of trichlorosilane and oxygen, thus forming impurity-containing siloxane complexes, then collecting the liquid state purified silicon source material having impurity-containing siloxane complexes with higher boiling point than the silicon source material, finally distilling to remove the siloxane complexes from the silicon source material.

DETAIL DESCRIPTION OF THE PRESENT INVENTION

Figure 1:
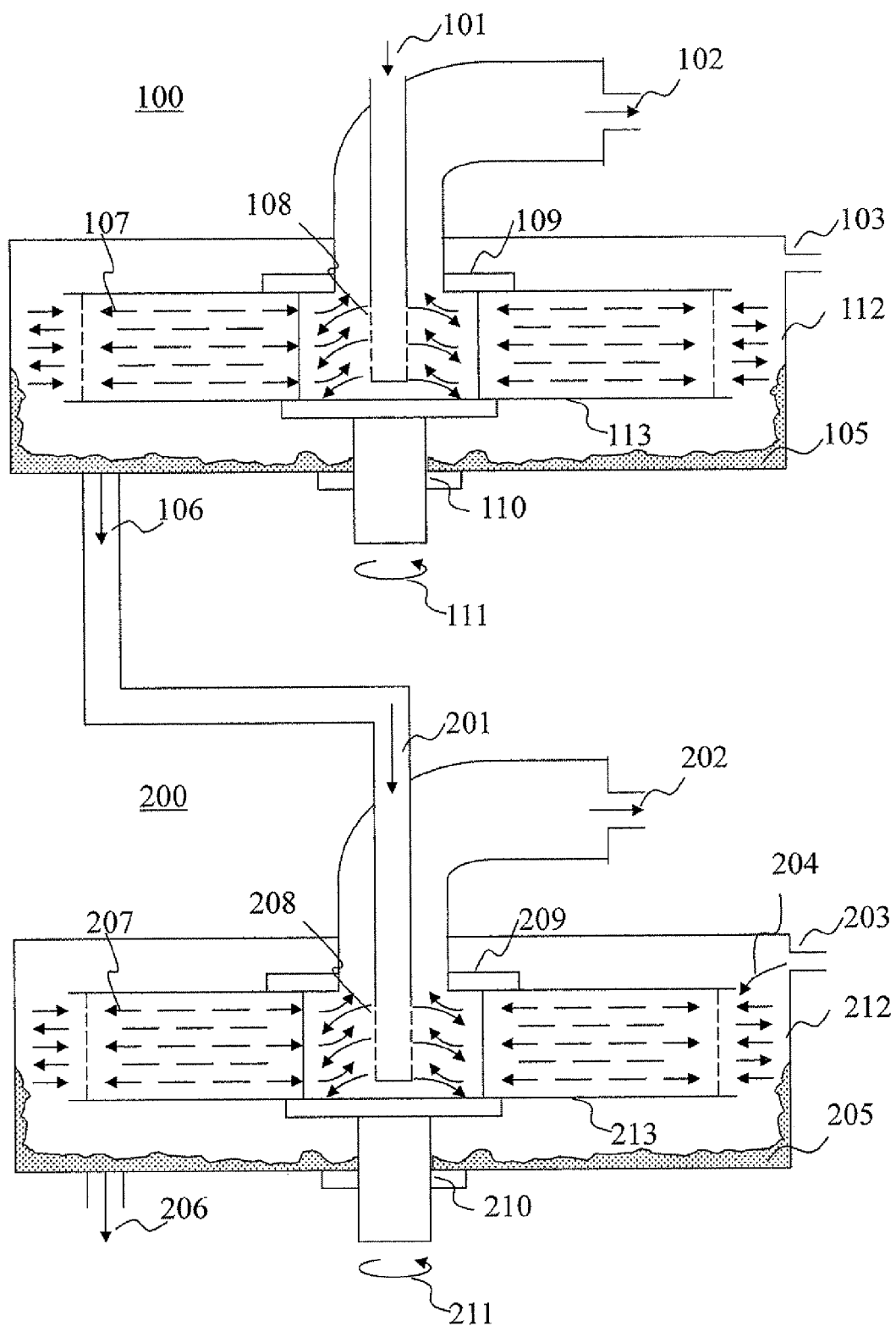
FIG. 1 shows a cross-sectional view of the high gravity rotating packed beds of the present invention.

The foregoing and other advantages of the invention will be more fully understood with reference to the description of the best embodiment and the drawing as the following description.

Figure 2:
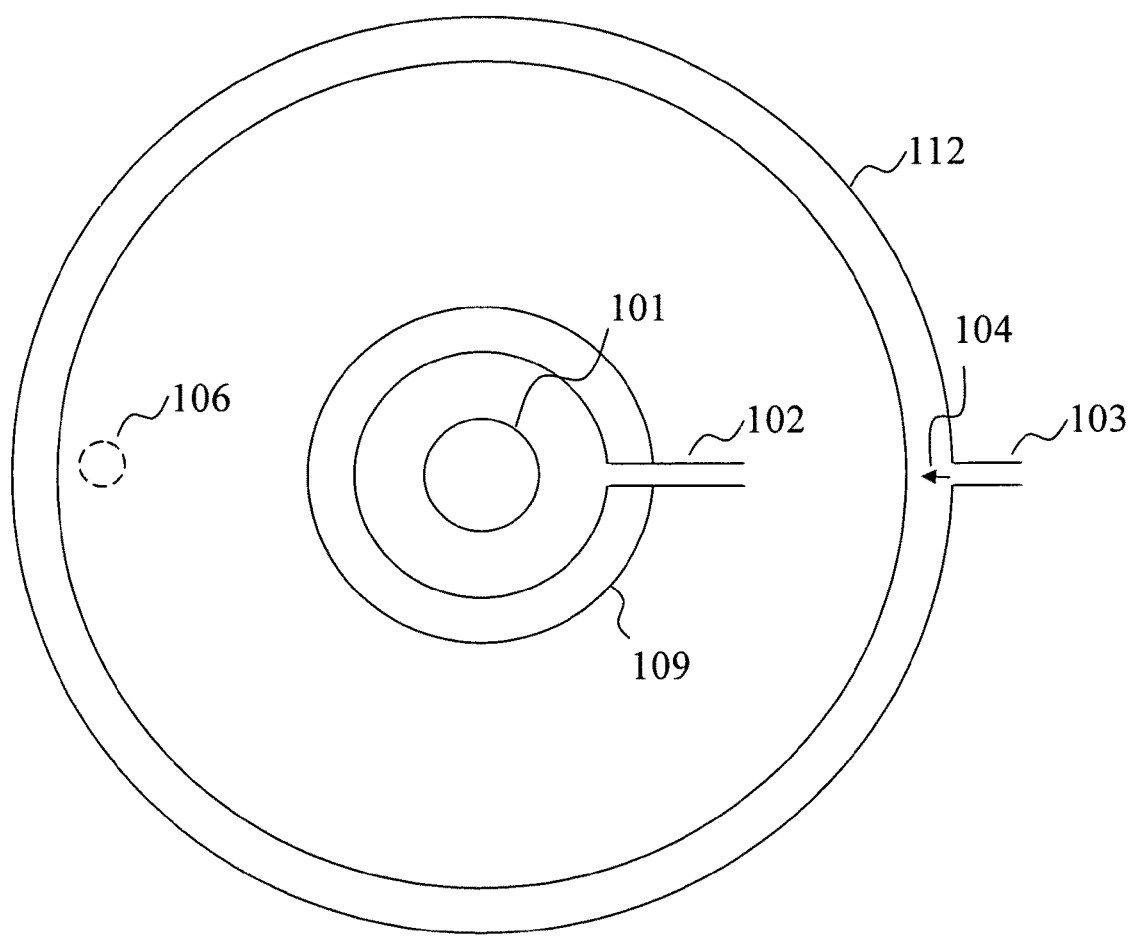
FIG. 2 shows a top-view of the high gravity rotating packed beds of the present invention.

The preferred embodiment of present invention is illustrated in FIG. 1. FIG. 1 shows a cross-sectional view of high gravity rotating packed beds of the present invention. FIG. 2 shows a top-view of the high gravity rotating packed beds of the present invention. A first high gravity rotating packed bed 100 has a chamber 112, a silicon source inlet 101 is used to feed the liquid state silicon source material such as trichlorosilane, tetrachloride or mixture of trichlorosilane and tetrachloride, the flow rate of this silicon source inlet 101 can be controlled by a controller (not shown), a gas outlet 102 is connected to a pump (not shown) to pump out the gas state impurities, the oxygen inlet 103 is closed. As the rotor 113 is driving by the rotation axis 111 within the seal 109 and 110 in a speed of about 1500 rpm, The inlet liquid silicon source is coming out from the distributor 108 inside a rotor 113 and swing out by the high gravity force, in the way of outgoing, the liquid is become droplet or thin film by the porous metal filler 107 in the rotor 113, so that the gas state impurities are easily separated and are pumping out via the gas outlet 102. no bubble nor solution can exist in the liquid state silicon source material, the purified liquid state silicon source material 105 is coming out via the silicon source material outlet 106.

A second high gravity rotating packed bed 200 has a chamber 212, a silicon source inlet 201, is used to feed the liquid state silicon source material from the silicon source material outlet 106, an oxygen inlet 203 is used to feed in oxygen, and is installed at the upper rim of the chamber 212, the flow rate of this oxygen inlet 203 can be controlled by a controller (not shown), a gas outlet 202 is connected to a pump (not shown) to pump out the gas state impurities and the surplus oxygen, As the rotor 213 is driving by the rotation axis 211 within the seal 209 and 210 in a speed of about 1500 rpm, the inlet liquid silicon source is coming out from the distributor 208 inside a rotor 213 and swing out by the high gravity force, in the way of outgoing, the liquid is become droplet or thin film by the porous metal filler 207 in the rotor 213, so that the gas state impurities are again easily separated and are pumping out via the gas outlet 202, no bubble nor solution can exist in the liquid state silicon source material. Oxygen is reacted in a lower temperature with the Si—H bond in trichlorosilane by mass transfer in the spongy metal filler 207 to form a SiOH species which in turn complexes impurities such as $BCl_3$ or $PCl_3$ present in the trichlorosilane, and form impurity containing siloxane complexes. The liquid state silicon source material 205 is coming out via the silicon source material outlet 206 for distillation.

The process of purifying silicon source materials is as follow: First stage, the silicon source materials, for example, trichlorosilane is cooled down to a temperature lower than the boiling point of silicon source material, for trichlorosilane it is 32° C., then feed to the silicon source inlet 101 of a first high gravity rotating packed bed 100, the flow rate for 1,250 ton/year of poly silicon is 195 g/sec of trichlorosilane, the rotating speed of the rotor 113 is about 1500 rpm, as the liquid state trichlorosilane go throw the porous metal filler 107, the liquid is become droplet or thin film and the gas state impurities such as $PH_3$, $B_2H_6$ or $SiH_4$ are easily separated and are pumping out via the gas outlet 102. In this process, no oxygen is used, preventing oxygen reacts with $PH_3$, $B_2H_6$ or $SiH_4$ etc. Second stage, the silicon source material coming out from the silicon source material outlet 106 is then fed to a second high gravity rotating packed bed 200 and oxygen is now applied to the oxygen inlet 203, oxygen is present in a molar ratio with trichlorosilane of about 0.005 to 0.5 by control the flow rate of trichlorosilane and oxygen. for example, for production of 1,250 ton/year poly silicon, the flow rate of trichlorosilane is 195 g/sec, 0.01 mole of oxygen is 0.375 g/sec. thus oxygen is reacted in a lower temperature with the Si—H bond in trichlorosilane by mass transfer in the porous metal filler 107 to form a SiOH species which in turn complexes impurities such as $BCl_3$ or $PCl_3$ present in the trichlorosilane, and form impurity containing siloxane complexes, this complexes is less volatile compare with trichlorosilane. Then trichlorosilane is easily accomplished during a subsequent one distillation step which separates the purified trichlorosilane form the less volatile complex boron or phosphorus compounds.

Although specific embodiments of the invention have been disclosed, it will be understood by those having skill in the art that minor changes can be made to the form and details of the specific embodiments disclosed herein, without departing from the spirit and the scope of the invention. The embodiments presented above are for purposes of example only and are not to be taken to limit the scope of the appended claims.

What is claimed is:

1. A process for purification of silicon source material including trichlorosilane by two high gravity rotating packed beds, for removing impurities including one or more of boron, phosphorus, in the form of chlorides, hydrides, or intermediate compounds containing both hydrogen and chlorine from said silicon source material, comprising the steps of:

passing said silicon source material in liquid state through a first high gravity rotating packed bed with porous metal, said first high gravity rotating packed bed is at a temperature lower than the boiling point of said silicon source material, no gas is fed to said first high gravity rotating packed bed, the impurities hydrides vapor and the other chlorosilane or silane with lower boiling point than said silicon source material are separated by pumping out for re-use or abandon, the output of said silicon source material is fed to the input of a second high gravity rotating packed bed;

passing said silicon source material in liquid state through a second high gravity rotating packed bed with porous metal, said second high gravity rotating packed bed is at a temperature lower than the boiling point of said silicon source material, oxygen is also fed to said second high gravity rotating packed bed from the upper rim to form impurity-containing siloxane complexes, the impurity hydrides vapor and the other chlorosilane or silane are separated once more by pumping out for re-use or abandon;

collecting the liquid state purified silicon source material having impurity-containing siloxane complexes with higher boiling point than said silicon source material;

using one distilling step to remove said siloxane complexes from said silicon source material.

2. A process of claim 1, wherein said silicon source material includes trichlorosilane and tetrachloride.

3. A process of claim 1, wherein said oxygen is present in a molar ratio with trichlorosilane of about 0.005 to 0.5.

4. A process of claim 1, wherein the silicon source inflow rate and the oxygen inflow rate of said second high gravity rotating packed bed can be controlled.

* * * * *